US007219097B2

(12) United States Patent
Okubo (10) Patent No.: US 7,219,097 B2
(45) Date of Patent: May 15, 2007

(54) AUTHENTICATION HISTORY CERTIFICATION SYSTEM AND METHOD THEREOF

(75) Inventor: Hiroshi Okubo, Kyoto (JP)

(73) Assignee: Kabushiki Kaisha Nihon Toukei Jim Center, Kyoto (JP)

( * ) Notice: Subject to any disclaimer, the term of this patent is extended or adjusted under 35 U.S.C. 154(b) by 858 days.

(21) Appl. No.: 10/048,886

(22) PCT Filed: Jun. 12, 2001

(86) PCT No.: PCT/JP01/04961

§ 371 (c)(1),
(2), (4) Date: Feb. 6, 2002

(87) PCT Pub. No.: WO01/97117

PCT Pub. Date: Dec. 20, 2001

(65) Prior Publication Data

US 2002/0116634 A1 Aug. 22, 2002

(30) Foreign Application Priority Data

Jun. 13, 2000 (JP) ............................. 2000-176325

(51) Int. Cl.
*G06F 17/30* (2006.01)
(52) U.S. Cl. .................. 707/10; 707/3; 707/6; 434/219
(58) Field of Classification Search .................... 707/3, 707/9, 7, 10, 6; 705/72, 75, 76, 11; 434/219
See application file for complete search history.

(56) References Cited

U.S. PATENT DOCUMENTS

| | | | | |
|---|---|---|---|---|
| 5,903,882 | A | * | 5/1999 | Asay et al. ...................... 707/9 |
| 6,041,318 | A | * | 3/2000 | Danford-Klein et al. .... 705/400 |
| 6,341,212 | B1 | * | 1/2002 | Shende et al. ............... 434/350 |
| 6,633,742 | B1 | * | 10/2003 | Turner et al. ................ 434/350 |
| 6,862,571 | B2 | * | 3/2005 | Martin et al. ................... 705/4 |
| 2001/0026914 | A1 | * | 10/2001 | Samuels et al. ............. 434/362 |
| 2002/0102525 | A1 | * | 8/2002 | Coppolino ................... 434/350 |

(Continued)

FOREIGN PATENT DOCUMENTS

JP 5-242159 9/1993

(Continued)

OTHER PUBLICATIONS

Li et al. Automatic berbal information verification for user authentication. Speech and Audio Processing, IEEE Transactions, Sep. 2000, vol. 8, issue 5, lines 585-596.*

(Continued)

*Primary Examiner*—John E. Breene
*Assistant Examiner*—Baoquoc N. To
(74) *Attorney, Agent, or Firm*—Keating & Bennett, LLP (57) ABSTRACT

To provide a system and its method for receiving inquiries for personal histories or performing certification of histories collectively.

The present invention provides an authentication history certification system for certifying a personal history on a computer system, including a history acquisition means (122) for acquiring and recording histories, a history verification means (123) for making a history inquiry or verification with an organization authorizing the history to verify whether or not a personal history is authentic, a history extraction means (124) for extracting and displaying a history, and a history certification means (125) for certifying a personal history defined by a history extracted from history data recorded and managed.

33 Claims, 3 Drawing Sheets

U.S. PATENT DOCUMENTS

| | | | |
|---|---|---|---|
| 2003/0077560 A1* | 4/2003 | Colby | 434/322 |
| 2004/0018480 A1* | 1/2004 | Patz et al. | 434/323 |
| 2005/0130114 A1* | 6/2005 | Bantz et al. | 434/362 |

FOREIGN PATENT DOCUMENTS

| | | |
|---|---|---|
| JP | 8-202780 | 8/1996 |
| JP | 08-212263 | 8/1996 |
| JP | 10-063716 | 3/1998 |
| JP | 11-096224 | 4/1999 |
| JP | 11-102392 | 4/1999 |
| JP | 11-149504 | 6/1999 |
| JP | 11-167591 | 6/1999 |
| JP | 11-175626 | 7/1999 |
| JP | 11-250165 | 9/1999 |
| JP | 2000-037976 | 2/2000 |

OTHER PUBLICATIONS

Basu et al. Authentication in e-commerce. Commnications of the ACM. vol. 46, Issue. 12, Dec. 2003, pp. 159-166.*

Official Communication issued in the corresponding Japanese Appliciation No. 2000-176325 mailed on Apr. 19, 2005.

Official Communication issued in the corresponding Japanese Appliciation No. 2000-176325 mailed on Jul. 16, 2002.

* cited by examiner

LIFELONG LEARNING PASSPORT

NAME
ADDRESS
DATE OF BIRTH
REGISTRATION NO. 260000001
E-MAIL

ACADEMIC RECORD

SHOWA OO: GRADUATED FROM OOO ELEMENTARY SCHOOL
SHOWA OO: GRADUATED FROM OOO JUNIOR HIGH SCHOOL
HEISEI OO: DROPPED OUT OF OOO HIGH SCHOOL
HEISEI OO: PASSED OOO HIGH SCHOOL EQUIVALENT TEST
HEISEI OO: ENTERED OOO COLLAGE
HEISEI OO: GRADUATED FROM OOO COLLAGE

QUALIFICATION/CERTIFICATION

HEISEI OO: ACQUIRED OTH OO CERTIFICATION O CLASS
HEISEI OO: ACQUIRED OTH OO CERTIFICATION O CLASS
HEISEI OO: WAS GRANTED OTH OO QUALIFICATION

TOTAL ACHIEVED SCORE OOO POINTS

VOLUNTEER ACTIVITY HISTORY

OO ACTIVITY HOSTED BY OO SCHOOL: XX HOURS OF PARTICIPATION
OO ACTIVITY HOSTED BY OO ASSOCIATION: XX HOURS OF PARTICIPATION
OO ACTIVITY HOSTED BY OO ASSOCIATION: XX HOURS OF PARTICIPATION

CUMULATIVE VOLUNTEER HOUR OOO HOURS

CAREER RECORD

SKILL/MISCELLANEOUS

AUTHENTICATION HISTORY CERTIFICATION SYSTEM AND METHOD THEREOF

BACKGROUND OF THE INVENTION

1. Field of the Invention

The present invention relates to a system and method for certifying histories for personal use, and more particularly, to a certificate issuing system and method for certifying, for example, lifelong histories of learning, activities and skills necessary for social activities such as attending schools and finding jobs.

2. Description of the Related Art

Presently, increasing numbers of individuals obtain qualifications to enhance their capabilities. There are many qualifications that are socially useful. For individuals to prove the qualifications, certificates must be granted from the organizations authorizing the respective qualifications to prove the possession of the qualifications. Thus, the absence of a collective certifier causes many complications and obscurities.

Moreover, in this day and age of lifelong learning, it is desirable that a passport that certifies what has been learned in one's life be issued.

In addition, the number of people who participate in volunteer activities is on the increase. Growing numbers of volunteers wish to have their activity hours accredited by various volunteer activity implementation organizations such that they can enjoy treatments associated with the accredited volunteer hours in the future.

SUMMARY OF THE INVENTION

To overcome the above-described problems, preferred embodiments of the present invention provide a system and method for receiving inquiries for personal histories or performing the certification of histories collectively.

More specifically, preferred embodiments of the present invention provide an authentication history certification system for certifying a personal history on a computer system including a history acquisition unit for acquiring and recording histories, a history verification unit for making a history inquiry or verification to an organization authorizing the history as to whether or not a personal history is authentic, a history extraction unit for extracting and displaying a history, and a certification unit for certifying, as a personal history, a history extracted from history data recorded and managed.

The authentication history certification system preferably includes a qualification or certification rating unit for establishing ratings of qualifications/certifications to rate an overall capability of a person who is certified.

The authentication history certification system according to preferred embodiments of the present invention further includes a benefit unit for granting a certain amount of benefits to a certification-authorizing organization for providing a commodity or service from the organization.

The authentication history certification system according to preferred embodiments of the present invention preferably includes a reception unit for receiving a certain amount of money in compensation for having certified a personal history.

In the authentication history certification system according to various preferred embodiments of the present invention, the histories to be certified include academic records, qualifications and certifications learned, volunteer activity records, and skills, or other suitable records and histories.

The history acquisition unit preferably includes a history update unit for updating the histories that are acquired and recorded.

The history verification unit inquires of organizations authorizing academic records, qualifications or certifications, and volunteer activity records about the authenticity of the histories, and records data obtained as a result of the inquiry as to the personal history as verified with history-related data acquired and recorded.

Alternatively, the history verification unit inquires of organizations authorizing academic records, qualifications or certifications, and volunteer activity records about the authenticity of the histories, and records data obtained as a result of the inquiry as to the personal history as not verified with history-related data acquired and recorded.

The certificates include any of a passport type certificate, a graduation certificate, an acceptance certificate, an activity accreditation, and a rating document, or other suitable records, certificates or documents.

The benefit unit preferably includes a payment unit for paying an inquiry fee of an academic record to a high school or collage authorizing the academic record.

The benefit unit further includes a grant unit for granting an activity fund to a volunteer activity implementation organization, and a payment unit for paying an inquiry issuance fee of a history to an organization authorizing the history.

The reception unit preferably includes a payment receipt unit for receiving payment of any fee out of a request and issuance fee of a student registration/graduation certificate, a student registration/graduation certificate fill-in fee, an acceptance certificate/academic transcript request and issuance fee, and an acceptance certificate or academic transcript fill-in fee from the person who is certified.

Another preferred embodiment of the present invention provides an authentication history certification method for certifying a personal history on a computer system including the steps of acquiring and recording histories, making a history inquiry or verification to an organization authorizing the history as to whether or not a personal history is authentic, extracting a history out of the histories acquired in the step of acquiring and recording histories, and displaying the same, and certifying, as a personal history, a history extracted from history data recorded and managed.

The authentication history certification method for certifying a personal history according to another preferred embodiment of the present invention includes the steps of prompting transmission of history-related data to acquire histories, making a history inquiry or verification to an organization authorizing the history as to whether or not a personal history is authentic, extracting a history from history-related data acquired in the history acquisition step and displaying the same, and certifying, as a personal history, a history extracted from history data recorded and managed.

The authentication history certification method further includes a step of establishing ratings of qualifications or certifications to rate an overall capability of a person who is certified.

The authentication history certification method further includes a step of granting a certain amount of benefits to a certification-authorizing organization for providing a commodity or service from the organization.

The authentication history certification method further includes a step of receiving a certain amount of money in compensation for having certified a personal history.

The histories to be certified in the authentication history certification method include academic records, qualifications or certifications learned, volunteer activity records, and skills, or other suitable records.

The history acquisition step preferably includes a history update step for updating the histories acquired and recorded.

The history verification step preferably inquires of the organizations authorizing academic records, qualifications or certifications, and volunteer activity records regarding the authenticity of the histories, and records data obtained as a result of the inquiry as to the personal history as verified with history-related data acquired and recorded.

Alternatively, the history verification step inquires of organizations that authorize academic records, qualifications or certifications, and volunteer activity records regarding the authenticity of the histories, and records data obtained as a result of the inquiry as to the personal history as not verified with history-related data acquired and recorded.

In the authentication history certification method according to preferred embodiments of the present invention, the certificates include any of a passport type certificate, a graduation certificate, an acceptance certificate, an activity accreditation, and a rating document, or other suitable record, certificate or document.

In the authentication history certification method according to preferred embodiment of the present invention, the step of granting benefits includes a step of paying an inquiry fee of an academic record to a high school or collage authorizing the academic record.

The step of granting benefits also preferably includes a step of granting an activity fund to a volunteer activity implementation organization.

The step of granting benefits also preferably includes a step of paying an inquiry issuance fee for a history to an organization authorizing the history.

The reception step includes a step of receiving payment of any fee arising from a request and issuance fee of a student registration or graduation certificate, a student registration or graduation certificate fill-in fee, an acceptance certificate or academic transcript request and issuance fee, and an acceptance certificate or academic transcript fill-in fee from the person who is certified.

The foregoing and other elements, steps, characteristics, features, and advantages of this invention will become more apparent from the following detailed description of preferred embodiments when read in conjunction with the drawings.

DETAILED DESCRIPTION OF PREFERRED EMBODIMENTS

The description of preferred embodiments of the present invention begins with an explanation of histories to be certified by the present invention.

Figure 3:
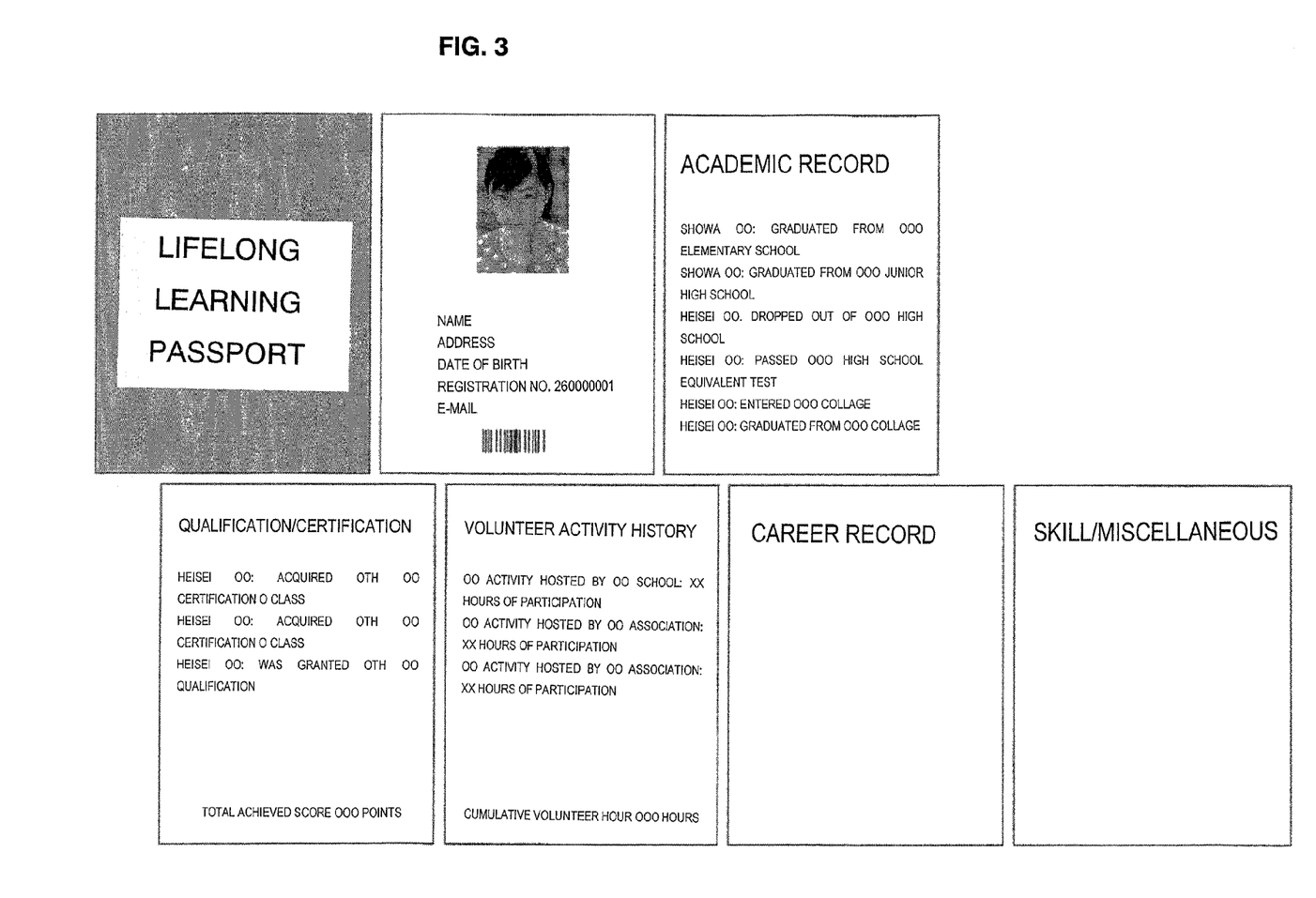
FIG. 3 is a schematic diagram of a certificate.

Initially, identification items for identifying individuals, such as the names, addresses, birth dates, registration numbers, and e-mail addresses of the persons to be certified, and the corresponding histories are certified.

Academic records such as the year a person graduated from a particular elementary school, the year the person graduated from a particular junior high school, the year the person dropped out of a particular high school, the year the person passed a high school equivalent test, the year the person entered a particular collage, and the year the person graduated from the collage in a particular department are displayed.

Qualifications or certifications including a certificate acquired for a particular class in a particular year, and a qualification granted for a particular qualification in a particular year are displayed. With some qualifications and certifications, scores are provided for the respective qualifications or certifications such that the total achieved scores of the scores granted to the qualifications or certifications of the individual person to be certified are displayed.

Volunteer activity histories such as the number of hours of participation in a particular activity hosted by a particular school, the number of hours of participation in a particular activity hosted by a particular association, and the number of hours of participation in a particular activity hosted by a particular association are compiled, and the cumulative activity hours thereof are displayed.

In addition, career records and skills are also displayed.

Figure 1:
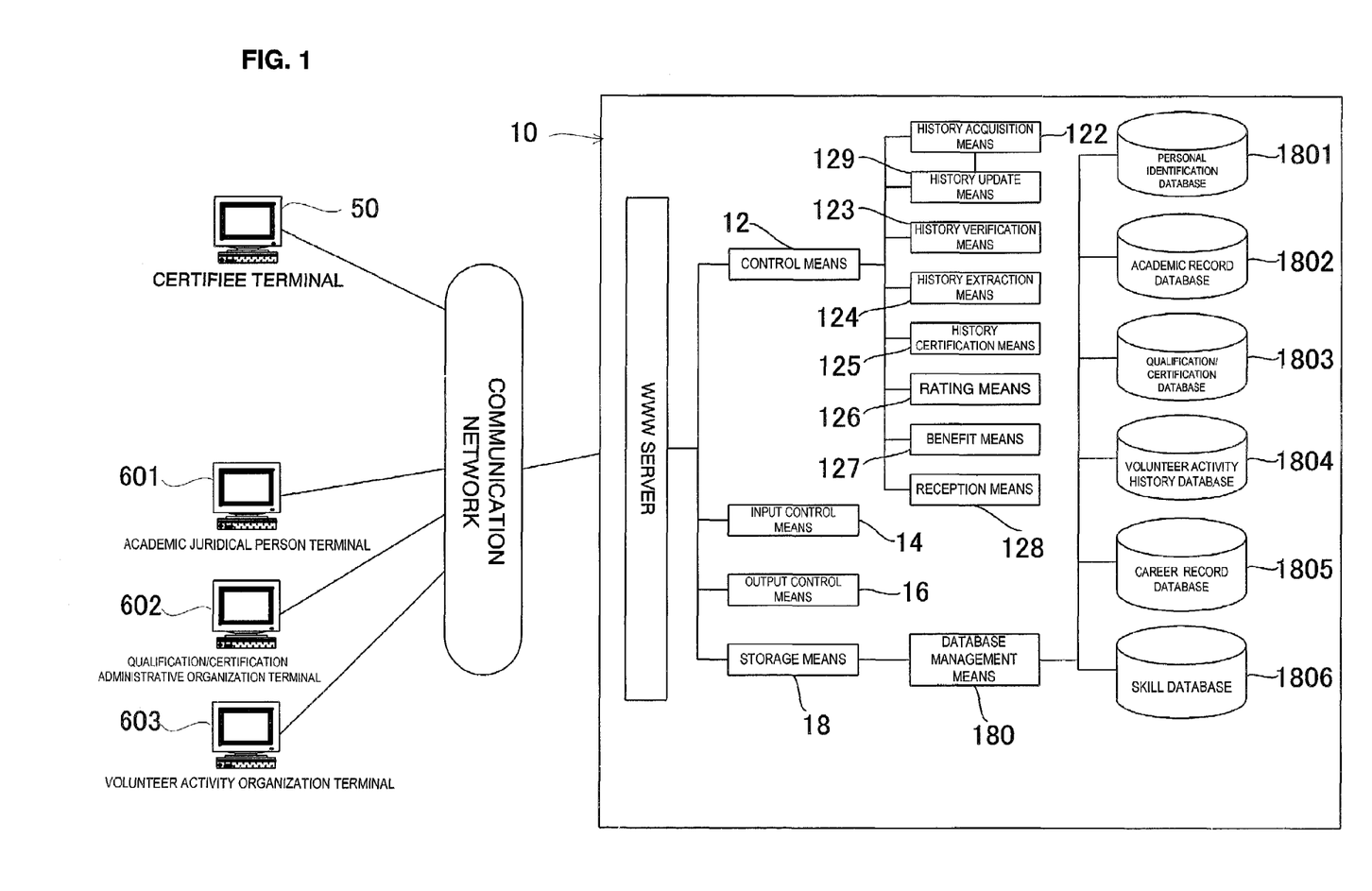
FIG. 1 is a diagram showing an example of a history certification system according to a preferred embodiment of the present invention.

FIG. 1 is a diagram showing an example of a history certification system according to a preferred embodiment of the present invention.

As shown in FIG. 1, the history certification system includes a history certification center 10 for certifying identification item information for identifying individuals as well as histories such as academic records, qualifications and certifications, volunteer activity histories, career records, and skills, or the histories of the individuals, or persons to be certified, based on requests from the persons to be certified.

The history certification center 10 includes a control means 12. The control means 12 includes a CPU which controls each component, transmission of data, various operations, and temporary storage of data.

The control means 12 controls history acquisition means 122, history verification means 123, history extraction means 124, history certification means 125, rating means 126, benefit means 127, reception means 128, history update means 129, and database management means 180.

Specifically, information processing equipment including a personal computer and a workstation is preferably utilized.

The history certification center 10 also includes input control means 14 that is configured to control the data input from terminals that are connected thereto via the Internet or other suitable network. The history certification center 10 further includes output control means 16 that is configured to control the data to be output to the terminals.

Moreover, the history certification center 10 includes storage means 18. The storage means 18 includes a main program, used in the control means 12, defined by a program for displaying a screen on the display units of the terminals and a search program for obtaining necessary information from databases.

The storage means 18 contains and manages a personal identification database 1801, an academic record database 1802, a qualification and certification database 1803, a volunteer activity history database 1804, a career record database 1805, and a skill database 1806 which are controlled and managed by the database management means 180.

The database management means 180 controls the personal identification database 1801, the academic record database 1802, the qualification and certification database 1803, the volunteer activity history database 1804, the career record database 1805, and the skill database 1806, and browse the information stored in storage devices defined by these databases.

The personal identification database 1801 stores identification items for identifying individuals, including the names, addresses, birth dates, registration numbers, and e-mail addresses of the persons to be certified.

The academic record database 1802 stores data the year a person graduated from a particular elementary school, the year the person graduated from a particular junior high school, the year the person dropped out of a particular high school, the year the person passed a high school equivalent test, the year the person entered a particular collage, and the year the person graduated from the collage in a particular department.

The qualification and certification database 1803 stores data such as a certification acquired from a particular class in a particular year, a particular qualification granted in a particular year, along with total achieved scores. The types of qualifications and certifications include interpreter-guide, translator, translation offical approval, the STEP Test, Japanese teacher, interpreter, BEST, the United Nations Association's Test of English, the Official Business Skill Test in International Business Communication, English Technical Writing Test, TOEIC, TOEFL, Jr. STEP Test, Practical Mathematics Proficiency Test, Japan Kanji Aptitude Test, Personal Computing Skills Test, care manager, caseworker, care worker, occupational therapist, physical therapist, sign language interpreter, teacher, child-care worker, medical secretary, nurse, dental hygienist, dental mechanic, orthoptist, data processing specialist, searcher, Ichitaro official certification, Lotus 1-2-3, CAD operator, CG designer, ISO international certifier, qualified energy manager, secretary skill test, certified bilingual secretary test, the Official Business Skill Test in Book-Keeping, tour conductor, advisory specialist for consumer's affairs, registered customs specialist, tracer, corrector, certified public accountant, certified tax accountant, small and medium enterprise management consultant, public consultant on social and labor insurance, patent attorney, acupuncture and moxibustion therapist, administrative scrivener, judicial scrivener, real estate appraiser, registered land and building investigator, registered real estate transaction manager, National Bar Examination, interior coodinator, national registered dietitian, cosmetologist, sommelier, food coodinator, colorist, shoe fitter, ski coach, kitchen specialist, confectionary hygienist, licensed cook, Kimono consultant, floral decorator, piano/electone player/instructor, trimmer, scuba diving instructor, DIY advisor, sport programmer, land surveyor (assistant), hazardous material operator, instructor in authorized driving school, large-sized motor vehicle type-I driving license, standard-sized motor vehicle type-II driving license, and auto mechanic, or other suitable information.

Scores are granted to the respective qualifications or certifications such that the total achieved scores are calculated and stored. For example, the Kanji Aptitude Test, ranging from the first to semi-tenth classes, are given different scores depending on the levels of difficulty of the respective classes. The criteria for granting scores are determined based on various factors, such as market shares (the numbers of examinees) and the numbers of years elapsed since the dates of acquisition. These criteria are not fixed but reviewed at regular intervals, e.g. yearly.

The volunteer activity history database 1804 stores data, such as the number of hours of participation in a particular activity hosted by a particular school, the number of hours of participation in a particular activity hosted by a particular association, and the number of hours of participation in a particular activity hosted by particular association, along with cumulative activity hours.

The career record database 1805 stores and manages data, such as: joined company A and belonged to department B in a particular month and year; left company A in a particular month and year; joined corporation C and belonged to D department in a particular month and year, and left corporation C in a particular month and year.

The skill database 1806 stores and manages data, such as a master of Japanese flora art style A, a master of the tea ceremony style B, a fencer of the Grade C, a judoist of the Xth grade, and a winner of 100-m freestyle in a particular competition.

The history acquisition means 122 is controlled by the control means 12 to acquire and record personal histories. The histories to be certified include academic records, qualifications and certifications learned, and volunteer activity records, and other suitable histories.

The history acquisition means 122 also includes the history update means 129 for updating the histories acquired and recorded.

The history verification means 123 is controlled by the control means 12 to compile a history inquiry or verification as to whether or not a personal history is authentic, from the organization authorizing the history. The history verification means 123 inquires of organizations authorizing academic records, qualifications and certifications, and volunteer activity records about the authenticity of the histories, and records data obtained as a result of the inquiry of the personal history as verified or not verified with history-related data acquired and recorded.

The history extraction means 124 is controlled by the control means 12 to extract history-certification-requested data from history-related databases managed by the database management means 180 and displays the same.

The history certification means 125 is controlled by the control means 12 to certify, as a personal history, a history extracted from the history data recorded and managed by the database management means 180. The history certification means 125 includes means for writing the extracted history of a person to be certified to a certificate based on a request from the person to be certified. The history certification means 125 also includes means for sending the extracted history information of a person to be certified to the person to be certified based on a request from the person to be certified.

The rating means 126 establishes ratings of qualifications and certifications to rate the overall capabilities of persons to be certified. The rating means 126 scores each qualification and certification. That is, the rating means 126 attributes scores to a variety of existing qualifications and certifications, respectively, and calculates and records the total scores of individuals. The rating depends upon the levels of difficulty of the qualifications or classes, the market shares (the numbers of examinees), or the numbers of years elapsed since the dates of acquisition.

The benefit means 127 grants a certain amount of benefit to a certification-authorizing organization for providing a commodity or service from the organization, and includes means for paying an inquiry fee for an academic record to a high school or collage authorizing the academic records and granting an activity fund to a volunteer activity implementation organization. The benefit means 127 also includes means for paying an inquiry issuance fee for a history to an organization authorizing the history.

The reception means 128 receives specific fees for the certification of personal histories. The reception means 128 includes means for receiving any fee arising from a request and issuance fee of a student registration or graduation certificate, a student registration or graduation certificate fill-in fee, an acceptance certificate or academic transcript request and issuance fee, and an acceptance certificate or academic transcript fill-in fee from the person to be certified.

In addition, the history certification center 10 includes servers such as a WWW server and a mail server that are stored in memories of the above-mentioned information processing equipment in the form of programs.

Then, over a wide area computer network (the Internet), the history certification center 10 is connected to a certifiee terminal 50 and organization terminals 60, i.e., an academic juridical person terminal 601 of a collage, high school, career collage, a qualification or certification administrative organization terminal 602, and a volunteer activity organization terminal 603.

The WWW server has WWW server means for constructing Web pages to be used as an access interface for the certifies terminal 50 and the organization terminals 60.

The WWW server also has certifies authentication means for performing authentication based on a password and an identifier (ID) which determines whether the certifiee terminal 50 that makes registration, browsing, and other requests to the databases managed by the database management means 180 is an authentic certifiee, whether it is an academic juridical person, whether it is a qualification or certification administrative organization, or whether it is a volunteer activity organization.

The certifiee terminal 50 is a terminal used to apply for a certificate issuance to the history certification center 10, and is defined by a personal computer, for example.

This certifiee terminal 50 has access means, such as a WWW browser, for exchanging various data with the WWW server. When this certifiee terminal 50 is a personal computer, the WWW browser is defined by a program stored in the memory thereof.

The organization terminals 60, such as a academic juridical person terminal 601, a qualification or certification administrative organization terminal 602, a volunteer activity organization terminal 603, or other terminals, are terminals used when certifications are, for example, verified in the attended or graduating school, the organization of the qualification or certification acquired, and the volunteer activity organization. The organization terminals 60 are defined by personal computers, for example.

These organization terminals 60 have access means, such as WWW browsers, for exchanging various data with the WWW server. When these organization terminals 60 are personal computers, the WWW browsers are defined by programs stored in the memories thereof.

Now, description will be given of the operation of this preferred embodiment.

Figure 2:
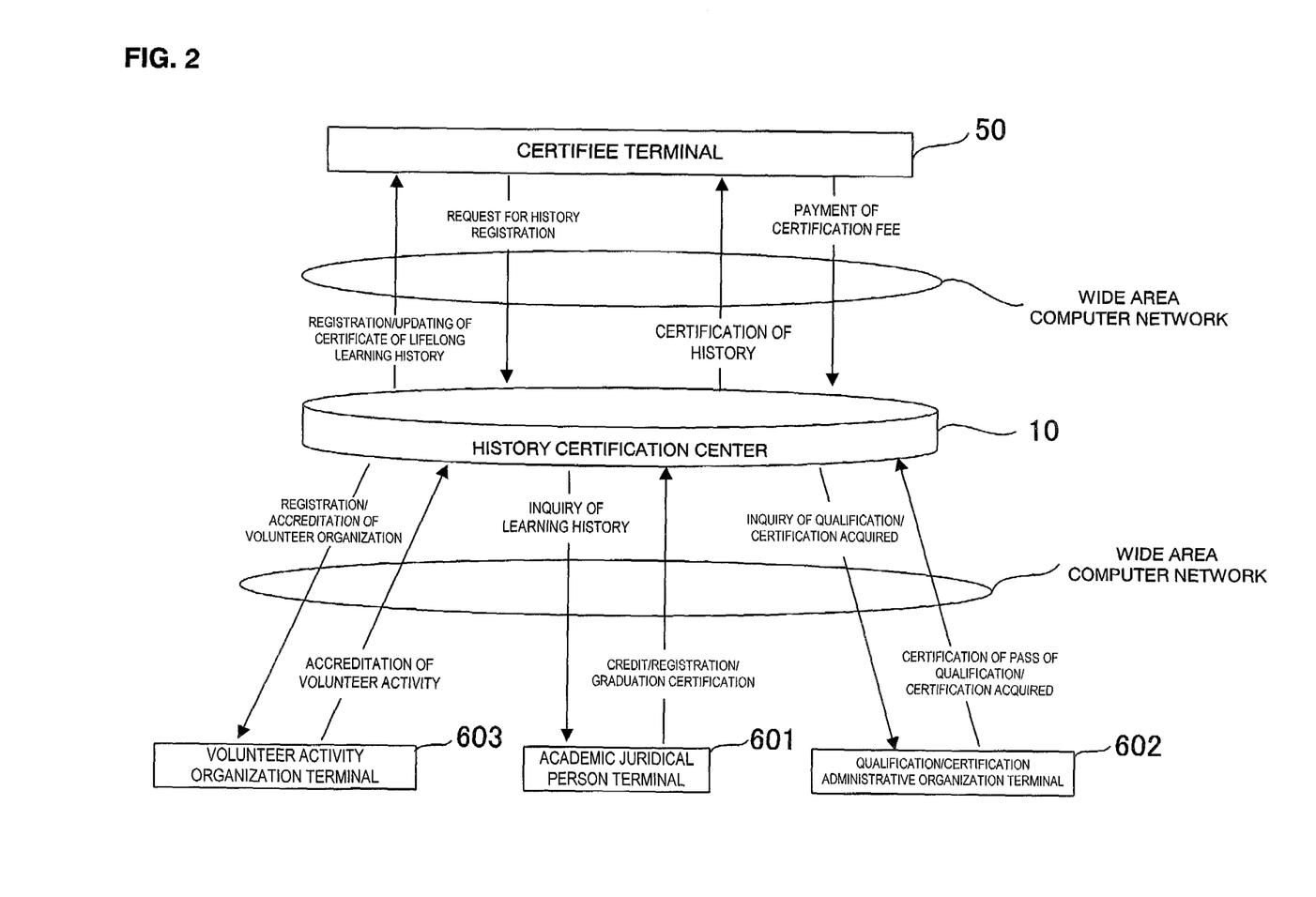
FIG. 2 is a diagram showing an overview of the operation of the present invention.

Initially, the certifiee terminal 50 is connected to the server in the history certification center 10. When the certifiee terminal 50 is connected to the server in the history certification center 10, the control means 12 detects this connection through the input control means 14 and controls the certifiee terminal 50 according to the main program.

The control means 12 initially displays a main menu screen (not shown) on the display unit of the certifiee terminal 50 that prompts the operator of the certifiee terminal 50 to select a desired process from among "registration," "search," "request for certification," and "request for certificate." A cursor is displayed on this main menu screen. Predetermined positions can be clicked on to perform a variety of operations.

The terminal operator of the certifiee terminal 50 makes a click operation to select the "registration" process. This is detected by the control means 12, which controls the display unit of the certifiee terminal 50 to display a registration menu screen. On this registration menu screen, a predetermined operation displays check buttons corresponding to individual processes such as "new registration," "update previous registration," and "delete previous registration." The terminal operator of the certifiee terminal 50 positions the cursor on a predetermined button display area, clicks on it, and then enters a password.

Upon completion of these operations, to inform the server in the history certification center, the terminal operator puts the cursor on a button display area and clicks on it.

In response to this operation, to avoid duplicate registrations, the control means 12 consults the personal identification database 1801 to check whether or not the registrant ID and the password entered have been used previously.

Here, if the control means 12 determines that the registrant ID and password have been used previously, the registration menu screen is displayed again. If the control means 12 determines that the registrant ID and password have not been used yet, the next step is performed.

The control means 12 controls the certifiee terminal 50 to display a screen that prompts input of one or a plurality of pieces of history data information, such as identification data, academic record data, qualification and certification data, volunteer activity history data, career record data, and skill data, into the certifies terminal 50.

Then, the control means 12 prompts the terminal operator of the certifiee terminal 50 to enter such certification items into the certifiee terminal 50.

Next, the control means 12 displays the certification items entered onto the display unit of the certifiee terminal 50, and prompts the terminal operator to confirm the contents thereof. Accordingly, under the control of the control means 12, if no errors are found in the certification items, the control means 12 displays the registration on the display unit of the certifiee terminal 50 and stores the same into the storage means 18 through the database management means 180.

In the storage means 18, the database management means 180 allocates the history data information among the personal identification database 1801, the academic record database 1802, the qualification and certification database 1803, the volunteer activity history database 1804, the career record database 1805, and the skill database 1806 for registration and management.

Next, description will be given of the operation of verifying the authenticity of the information of history data registered by a person to be certified.

In the history certification center 10, whether or not a history inquiry or a certificate request is made by a person to be certified, the control means 12 exercises control through the input control means 14 to control the organization terminals 60 to display accreditation inquiry screens in which respective inquiries or accreditations are made, wherein requests for certification or accreditation inquiries are made on the organization terminals 60 and the input of the results is prompted.

An organization body, for example, an academic juridical person having the academic juridical person terminal 601 verifies the academic record inquired by the history certification center 10, and inputs the contents of the verification being made on a history inquiry accreditation screen.

In the history certification center 10, the control means 12 records the verification being made through the output control means 16 into the academic record database 1802 previously acquired and recorded in the database management means 180 based on the data obtained from the academic juridical person terminal 601 as a result of the inquiry.

The other organizations similarly verify qualifications and certifications and volunteer activity records via the qualification and certification administrative organization terminal 602 and volunteer activity organization terminal 603, respectively, and input the contents of the verification being made on the history inquiry accreditation screens.

In the history certification center 10, the control means 12 records the verification being made through the output control means 16 into the qualification and certification database 1803 and the volunteer activity history database 1804 previously acquired and recorded in the database management means 180, based on the data that is obtained from the qualification and certification administrative organization terminal 602 and the volunteer activity organization terminal 603 as the result of the inquiries.

Next, description will be given of the method of certifying a certifies in the history certification center 10.

When a history inquiry or a certificate request is made from a certifiee terminal 50, the certifiee terminal 50 initially establishes connection with the history certification center 10, and is sent with an ID code input screen as a certifies authentication screen. The certifies authentication screen is a screen for prompting input of certifies authentication information. The certifiee terminal 50 receives and displays the certifies authentication screen, inputs certifiee authentication information, and sends the same to the history certification center 10.

The certifiee authentication information is information such as a password and a user ID.

The history certification center 10 receives the certifiee authentication information and, based on the certifiee authentication information, consults the personal identification database 1801 through the control means 12 and the database management means 180 for authentication.

Next, the control means 12 displays a certificate request screen on the certifies terminal 50 through the input control means 14 and, to select "request for certificate" or "history inquiry" process, controls the display of the certificate request screen to prompt the terminal operator for a certification request.

When "history inquiry" or "request for certificate" is issued from the certifiee terminal 50 or no verification of the organization terminals 60 is made, the history certification center 10 exercises control through the input control means 14 on the organization terminals 60 to display the accreditation inquiry screens in which respective inquiries or accreditations are made, whereby requests for certification accreditation inquiries on the organization terminals 60 are made and the input of the results is prompted. The organization terminals 60, such as the academic juridical person having the academic juridical person terminal 601, verify the histories acquired by the history certification center 10, and input the contents of the verification being made on the history inquiry accreditation screens. In the history certification center 10, the control means 12 records the verification being made through the output control means 16 into the data previously acquired and recorded in the database management means 180, based on the data that is obtained from the organization terminals 60 as the result of the inquiries.

Next, in the history certification center 10, according to a request from the certifiee terminal 50, each history of the certifiee managed by the database management means 180 is extracted, displayed as a certificate (shown in FIG. 3), and sent. The certificates are the form of an IC card or other suitable means.

Among the certificates are student registration certification, graduation certification, acceptance certification, activity accreditation, and ratings, and other suitable certificates.

In the case of "history inquiry," according to a request from the certifiee terminal 50, the details of the certification are sent to the certifies terminal 50, and the extracted histories of the certifiee are not simply written into certificates.

Among a variety of histories acquired by the history acquisition means 122 are various types of qualifications and certifications. In the history certification center 10, the rating means 126 grants certain scores to the respective qualifications and certifications recorded on the qualification and certification database 1803, calculates total achieved scores of certifiees with respect to the qualifications and certifications, and records and manages the rating scores in the qualification and certification database 1803 via the database management means 180.

Additionally, the rating means 126 calculates the numbers of hours of the volunteer activity histories recorded in the volunteer activity history database 1804, and records and manages the cumulative volunteer hours in the volunteer activity history database 1804 through the database management means 180.

The history certification center 10 provided with such services as the certification of histories by the organizations grants benefits for the respective organizations through the benefit means 127.

Specifically, payments are made through transfers to a banking system.

For example, history certification center 10 grants a volunteer activity implementation organization a certain percentage of collected money that is an amount of contribution to be contributed as an activity fund, through the benefit means 127. The history certification center 10 also sends a screen to the volunteer activity organization terminal 603 through the control means 12, and displays on the sent screen the total amount of money paid for a month or for several months to inform the volunteer activity implementation organization of the amount of benefits.

Moreover, the history certification center 10 pays history inquiry issuance fees to such organizations as collages, high schools, career collages, and other academic institutes through the benefit means 127. The history certification center 10 also sends a screen to the academic juridical person terminal 601 through the control means 12, and displays on the sent screen the total amount of fees paid for a month or for several months to inform the organization of the amount of benefits.

In addition, the history certification center 10 pays history inquiry issuance fees to such organizations as qualification and certification organizations through the benefit means 127. The history certification center 10 also sends a screen to the qualification and certification administrative organization terminal 602 through the control means 12, and displays on the sent screen the total amount of fees paid for a month or for several months to inform the organization of the amount of benefits.

For the certifiee having his/her histories certified, the history certification center 10 displays, through the reception means 128, the amount of the acceptance certificate or academic transcript request and issuance fee and the amount of the certificate fill-in fee on a screen sent to the certifiee terminal 50, and sends a screen to prompt a transfer.

Furthermore, the reception means 128 collates the amount transferred from the person to be certified with the amount of the fees charged to the person to be certified, and confirms reception or non-reception.

As described above, according to various preferred embodiments of the present invention, a system and its method for receiving inquiries for personal histories or performing the certification of histories collectively are provided.

While preferred embodiments of the invention have been described above, it is to be understood that variations and modifications will be apparent to those skilled in the art without departing the scope and spirit of the invention. The scope of the invention, therefore, is to be determined solely by the following claims.

The invention claimed is:

1. An authentication history certification system for certifee a personal history using a computer system via a wide area computer network, comprising:

history acquisition means connected to a certifiee terminal for acquiring and recording history data transmitted from the certifiee terminal;

storage means for storing at least one piece of history data retrieved from the certifiee terminal, including identification data, academic record data, qualification and certification data, volunteer activity history data, career record data and skill data, and the qualification and certification data including dates of acquisition of qualifications or classes and rating scores of the certifiee;

qualification and certification rating means for establishing ratings of qualifications and certifications based on the qualification and certification data stored in the storage means to rate an overall capability of a person to be certified comprising:

means for establishing ratings of qualifications and certifications by attributing scores to each item of qualification and certification data, respectively, based on at least one of the levels of difficulty of the qualifications or classes and the number of examinees and based on the numbers of years elapsed since the date of acquisition of the qualifications and classes; and means for calculating the total of the attributed scores of the qualification and certification data of the certifiee and recording the same in the storage means;

history verification means connected to a terminal of an organization authorizing the history for making a history inquiry of or verification with an organization authorizing the history whether or not the history is authentic by controlling the organization terminals to display accreditation inquiry screens in which respective inquiries or accreditations are made, wherein requests for certification or accreditation inquires are transmitted to the organization terminals and input of the result is prompted;

history extraction means for extracting and displaying a history from the history data stored in the storage means acquired and recorded by said history acquisition means and the total attributed score calculated by said qualification and certification ratings means and stored in said storage means;

certification means for certifying a personal history defined by the history extracted by the history extraction means from the history data that are acquired and recorded by the history acquisition means, and for providing certificates; and control means for controlling said history acquisition means, said storage means, said qualification and certification rating means, said history verification means, said history extraction means and said certification means.

2. An authentication history certification system according to claim 1, further comprising benefit means for granting a certain amount of benefits to a certification-authorizing organization for providing a commodity or service from the certification-authorizing organization.

3. An authentication history certification system according to claim 1, further comprising reception means for receiving a certain amount of money in compensation for having certified a personal history.

4. An authentication history certification system according to claim 1, wherein said history acquisition means includes history update means for updating the history data acquired and recorded by the history acquisition means.

5. An authentication history certification system according to claim 1, wherein said history verification means inquires of organizations authorizing academic records, qualifications and certifications, and volunteer activity records to authenticate the histories, and records data obtained as a result of the inquiry regarding the histories as verified with history data acquired and recorded by the history acquisition means.

6. An authentication history certification system according to claim 1, wherein said history verification means inquires of organizations authorizing academic records, qualifications and certifications, and volunteer activity records as to the authenticity of the histories, and records data obtained as a result of the inquiry regarding the histories as not verified with history data acquired and recorded by the history acquisition means.

7. An authentication history certification system according to claim 1, wherein said certificates include at least one of a passport type certificate, a graduation certificate, an acceptance certificate, an activity accreditation, and a rating document.

8. An authentication history certification system according to claim 2, wherein said benefit means includes means for paying an inquiry fee for an academic record to a high school or collage authorizing the academic record.

9. An authentication history certification system according to claim 2, wherein said benefit means includes means for granting an activity fund to a volunteer activity implementation organization.

10. An authentication history certification system according to claim 2, wherein said benefit means includes means for paying an inquiry issuance fee for a history to an organization authorizing the history.

11. An authentication history certification system according to claim 3, wherein said reception means includes means for receiving payment of any fee resulting from a request and issuance fee of a student registration or graduation certificate, a student registration or graduation certificate fill-in fee, an acceptance certificate or academic transcript request and issuance fee, and an acceptance certificate or academic transcript fill-in fee from the person to be certified.

12. An authentication history certification method for certifying a personal history using a computer system via a wide area computer network, comprising the steps of:

acquiring and recording history data transmitted from a certifiee terminal;

storing at least one piece of history data retrieved from the certifiee terminal, including identification data, academic record data, qualification and certification data, volunteer activity history data, career record data and skill data, and the qualification and certification data including the dates of acquisition of qualification or classes and rating scores of the certifiee;

establishing ratings of qualifications and certifications to rate an overall capability of a person to be certified comprising:

establishing the ratings of qualifications and certifications by attributing scores to each item of qualification and certification data stored in the storing step, based on at least one of the levels of difficulty of the qualifications or classes and the number of examinees and based on the number of years elapsed since the date of acquisition of the qualifications or classes; and calculating the total of the attributed scores of the qualification and certification data of the certifiee and recording the same in a storage means;

making a history inquiry of or verification with a terminal of an organization authorizing the history to verify whether or not a personal history is authentic by controlling the organization terminal to display accreditation inquiry screens in which respective inquiries or accreditations are made, wherein requests for certification or accreditation inquiries are transmitted to the organization terminal and input of the result is prompted;

extracting a history from the history data acquired and recorded in the step of acquiring and recording history data and the total attributed score calculated in the step of calculating the total attributed score of the qualification and certification data, and displaying the same; and certifying a personal history defined by the history extracted from the history data that are acquired and recorded.

13. An authentication history certification method according to claim 12, further comprising a step of granting a certain amount of benefits to a certification-authorizing organization for providing a commodity or service from the organization.

14. An authentication history certification method according to claim 12, further comprising a step of receiving a certain amount of money in compensation for certifying a personal history.

15. An authentication history certification method according to claim 12, wherein said step of acquiring and recording history data includes a step of updating the history data acquired.

16. An authentication history certification method according to claim 12, wherein said history verification step inquires of organizations authorizing academic records, qualifications and certifications, and volunteer activity records to verify the authenticity of the histories, and records data obtained as a result of the inquiry regarding the personal history as verified with history data acquired and recorded.

17. An authentication history certification method according to claim 12, wherein said history verification step inquires of organizations authorizing academic records, qualifications and certifications, and volunteer activity records to verify the authenticity of the histories, and records data obtained as a result of the inquiry regarding the personal history as not verified with history data acquired.

18. An authentication history certification method according to claim 12, wherein said certificates include at least one of a passport type certificate, a graduation certificate, an acceptance certificate, an activity accreditation, and a rating document.

19. An authentication history certification method according to claim 13, wherein said step of granting benefits includes a step of paying an inquiry fee for an academic record to a high school or collage authorizing the academic record.

20. An authentication history certification method according to claim 13, wherein said step of granting benefits includes a step of granting an activity fund to a volunteer activity implementation organization.

21. An authentication history certification method according to claim 13, wherein said step of granting benefits includes a step of paying an inquiry issuance fee for a history to an organization authorizing the history.

22. An authentication history certification method according to claim 14, wherein said reception step includes a step of receiving payment of any fee resulting from a request and issuance fee for a student registration or graduation certificate, a student registration or graduation certificate fill-in fee, an acceptance certificate or academic transcript request and issuance fee, and an acceptance certificate or academic transcript fill-in fee from the certifiee.

23. An authentication history certification method for certifying a personal history using a computer via a wide area computer network, comprising the steps of:

prompting transmission of history data from a certifiee terminal to acquire histories;

storing at least one piece of history data retrieved from the certifiee terminal, including identification data, academic record data, qualification and certification data, volunteer activity history data, career record data and skill data, and the qualification and certification data including the dates of acquisition of qualification or classes and rating scores of the certifiee;

establishing ratings of qualifications and certifications based on the qualification and certification data to rate an overall capability of a person to be certified comprising:

establishing ratings of the qualifications and certifications by attributing scores to each item of qualification and certification data, based on at least one of the levels of difficulty of the qualifications or classes and the number of examinees and based on the number of years elapsed since the date of acquisition of the qualifications or classes; and calculating the total of the attributed scores of the qualification and certification data of the certifiee and recording the same in a storage means;

making a history inquiry of or verification with a terminal of an organization authorizing the history to verify whether or not a personal history is authentic by controlling the organization terminal to display accreditation inquiry screens in which respective inquiries or accreditations are made, wherein requests for certification or accreditation inquiries are transmitted to the organization terminal and input of the result is prompted;

extracting a history from the history data acquired and recorded in the step of acquiring and recording history data and the total attributed score calculated in the step of calculating the total attributed score of the qualification and certification data, and displaying the same; and certifying a personal history defined by the history extracted from the history data that are acquired and recorded.

24. An authentication history certification method according to claim 23, further comprising a step of granting a certain amount of benefits to a certification-authorizing organization for providing a commodity or service from the organization.

25. An authentication history certification method according to claim 23, further comprising a step of receiving a certain amount of money in compensation for certifying a personal history.

26. An authentication history certification method according to claim 23, wherein said step of prompting transmission of history-related data to acquire histories includes a step of updating the history data acquired.

27. An authentication history certification method according to claim 23, wherein said history verification step inquires of organizations authorizing academic records, qualifications and certifications, and volunteer activity records to verify the authenticity of the histories, and records data obtained as a result of the inquiry regarding the personal history as verified with history data acquired and recorded.

28. An authentication history certification method according to claim 23, wherein said history verification step inquires of organizations authorizing academic records, qualifications and certifications, and volunteer activity records to verify the authenticity of the histories, and records data obtained as a result of the inquiry regarding the personal history as not verified with history data acquired.

29. An authentication history certification method according to claim 23, wherein said certificates include at least one of a passport type certificate, a graduation certificate, an acceptance certificate, an activity accreditation, and a rating document.

30. An authentication history certification method according to claim 24, wherein said step of granting benefits includes a step of paying an inquiry fee for an academic record to a high school or collage authorizing the academic record.

31. An authentication history certification method according to claim 24, wherein said step of granting benefits includes a step of granting an activity fund to a volunteer activity implementation organization.

32. An authentication history certification method according to claim 24, wherein said step of granting benefits includes a step of paying an inquiry issuance fee for a history to an organization authorizing the history.

33. An authentication history certification method according to claim 25, wherein said reception step includes a step of receiving payment of any fee resulting from a request and issuance fee for a student registration or graduation certificate, a student registration or graduation certificate fill-in fee, an acceptance certificate or academic transcript request and issuance fee, and an acceptance certificate or academic transcript fill-in fee from the certifiee.

* * * * *